United States Patent
Acosta

(10) Patent No.: US 7,159,485 B2
(45) Date of Patent: Jan. 9, 2007

(54) CANTILEVER DAMPENED DRIVE ASSEMBLY FOR WINDOWLIFT MOTORS

(75) Inventor: Luis E. Acosta, Lawrenceville, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 566 days.

(21) Appl. No.: 10/661,246

(22) Filed: Sep. 12, 2003

(65) Prior Publication Data
US 2005/0028629 A1    Feb. 10, 2005

Related U.S. Application Data

(60) Provisional application No. 60/493,256, filed on Aug. 7, 2003.

(51) Int. Cl.
*F16H 1/16* (2006.01)

(52) U.S. Cl. .............. 74/425; 74/411; 464/73; 464/92

(58) Field of Classification Search ............... 74/411, 74/425; 464/73, 92
See application file for complete search history.

(56) References Cited

U.S. PATENT DOCUMENTS

| | | | | |
|---|---|---|---|---|
| 5,178,026 A | * | 1/1993 | Matsumoto | 74/411 |
| 5,956,998 A | * | 9/1999 | Fenelon | 74/89.17 |
| 6,169,346 B1 | * | 1/2001 | Nakamura et al. | 310/75 D |
| 6,460,650 B1 | * | 10/2002 | Tsuboi et al. | 180/444 |
| 6,481,306 B1 | * | 11/2002 | Adachi et al. | 74/425 |
| 2004/0060379 A1 | * | 4/2004 | Bernhard et al. | 74/388 PS |

* cited by examiner

*Primary Examiner*—David Fenstermacher

(57) ABSTRACT

A drive assembly 21 is provided for an electric motor 10 having a rotatable shaft 12 including a worm 14. The drive assembly includes an output gear 16 constructed and arranged to mesh with the worm. The output gear includes a plurality of arms 22 extending generally from a periphery of the output gear radially towards a center of the output gear. A driver 18 is operatively associated with the output gear to rotate therewith. The driver includes a plurality of cams 24 near a periphery thereof. The cams are operatively associated with the arms so that when the driver stops rotating while the output gear continues to rotate, each cam engages an associated arm to absorb kinetic energy of the output gear while the motor stalls.

20 Claims, 3 Drawing Sheets

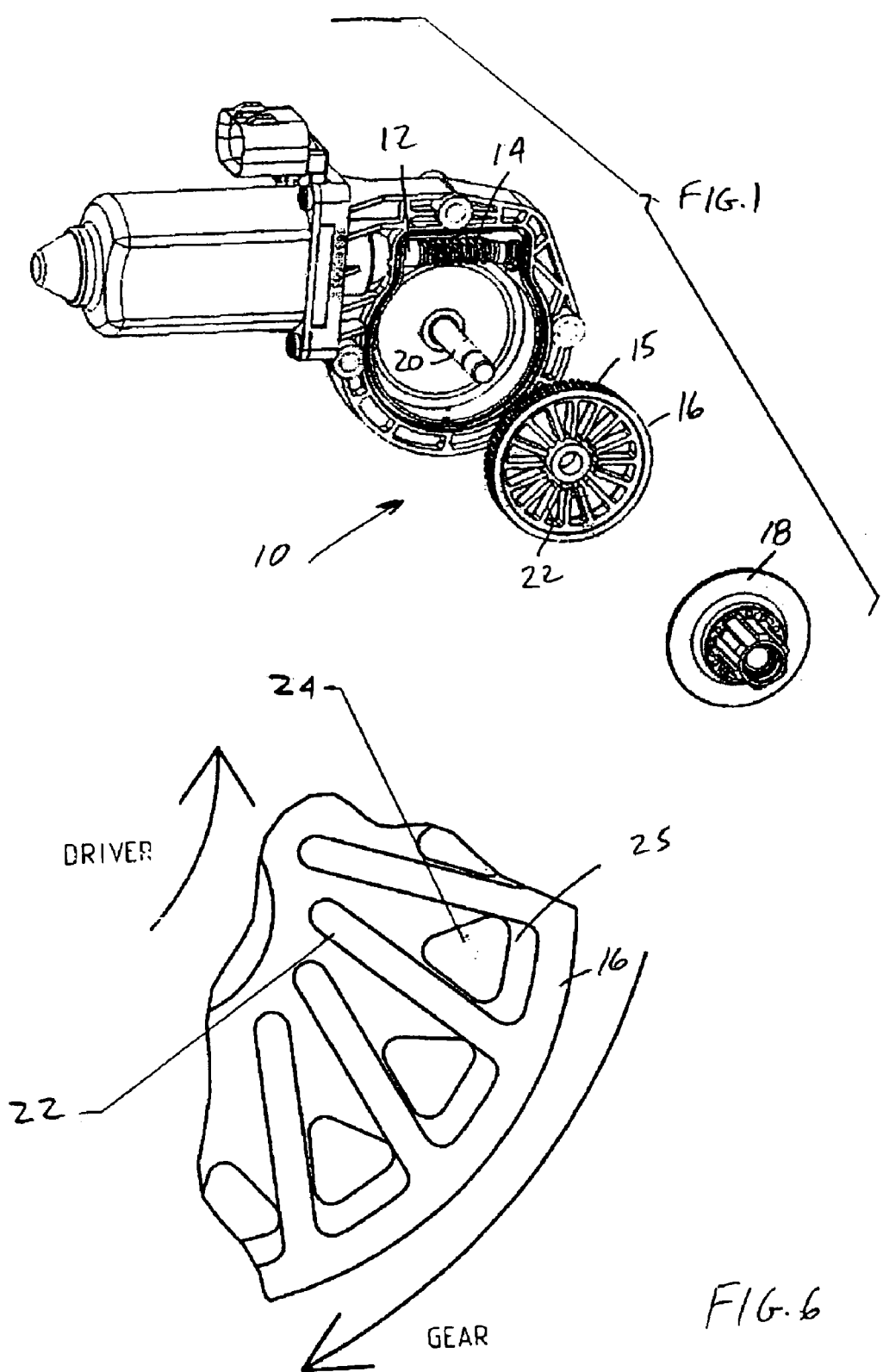

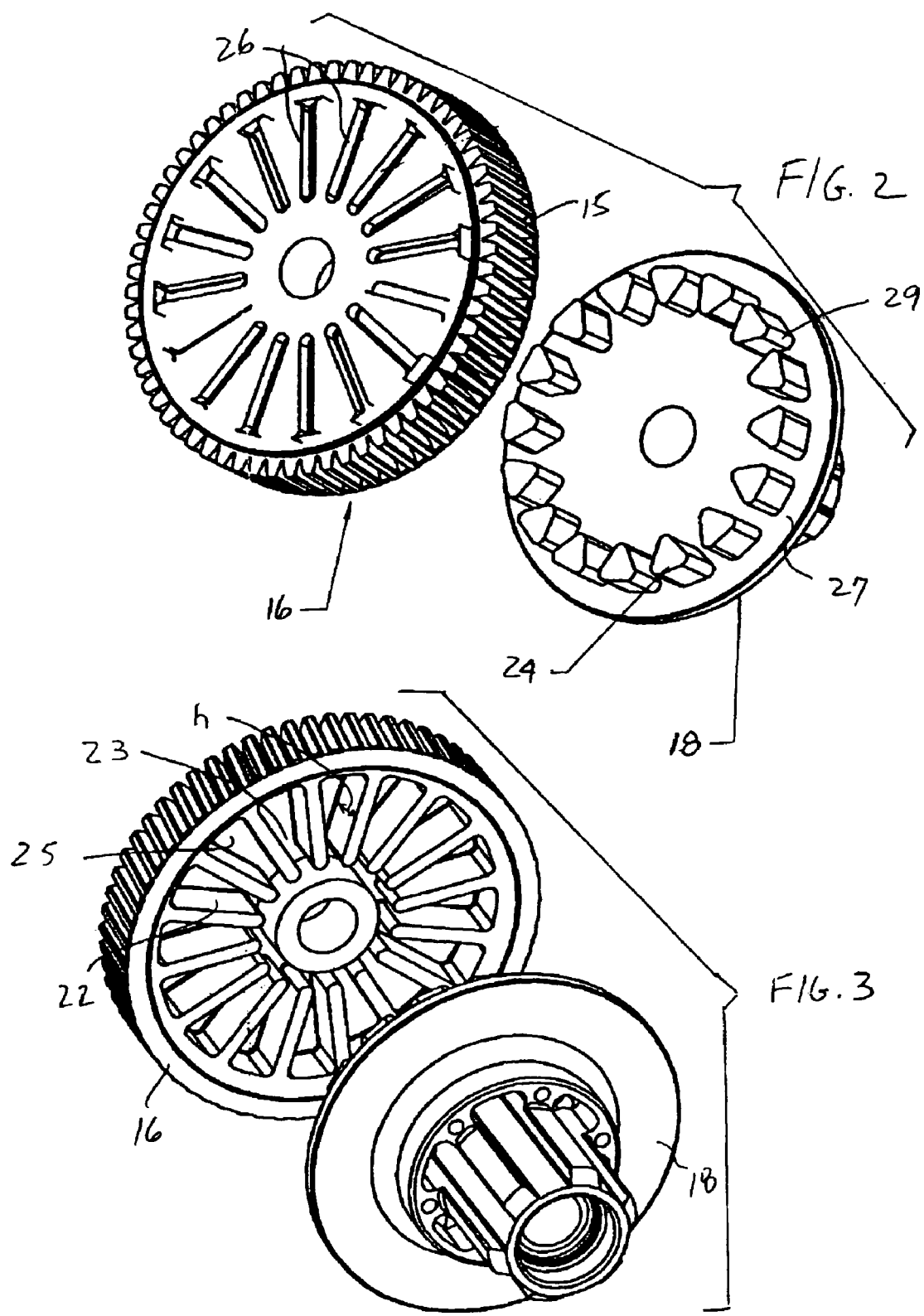

CANTILEVER DAMPENED DRIVE ASSEMBLY FOR WINDOWLIFT MOTORS

This application is based on U.S. Provisional Application No. 60/493,256, filed on Aug. 7, 2003 and claims the benefit thereof for priority purposes.

FIELD OF THE INVENTION

The invention relates to electric motors and more particularly to an assembly that provides dampening of the drive and gear components of a windowlift motor.

BACKGROUND OF THE INVENTION

Certain electric motors have a drive element and a gear component that define a drive assembly. With such drive assemblies, there is a need to provide dampening of the drive element and gear component when a system (e.g., a automotive window regulator) employing the drive assembly reaches end of travel and the motor stalls. Currently, this function is achieved by placing rubber dampeners located radially around the axis of rotation inside the drive assembly. As the system reaches the end of travel, the drive element of the assembly stops while the gear component of the assembly continues to rotate. The dampener absorbs this kinetic energy while the motor stalls. The additional component of the rubber dampener adds cost and increases assembly time of the motor.

Accordingly, there is a need to provide a drive assembly of a motor having a kinetic energy dampening feature without the need for additional components of the assembly.

SUMMMARY OF THE INVENTION

An object of the present invention is to fulfill the need referred to above. In accordance with the principles of the present invention, this objective is obtained by a providing a drive assembly for an electric motor having a rotatable shaft including a worm. The drive assembly includes an output gear constructed and arranged to mesh with the worm. The output gear includes a plurality of arms extending generally from a periphery of the output gear radially towards a center of the output gear. A driver is operatively associated with the output gear to rotate therewith. The driver includes a plurality of cams near a periphery thereof. The cams are operatively associated with the arms so that when the driver stops rotating while the output gear continues to rotate, each cam engages an associated arm to absorb kinetic energy of the output gear while the motor stalls.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 1 is an exploded view of a windowlift motor provided in accordance with the principles of the invention.

FIG. 2 is a rear exploded view of the output gear and driver of the motor of FIG. 1.

FIG. 3 is a front exploded view of the output gear and driver of the motor of FIG. 1.

FIG. 6 is an enlarged view of a portion of the output gear and driver of the motor of the invention.

DETAILED DESCRIPTION OF THE EXEMPLARY EMBODIMENT

Figure 4:
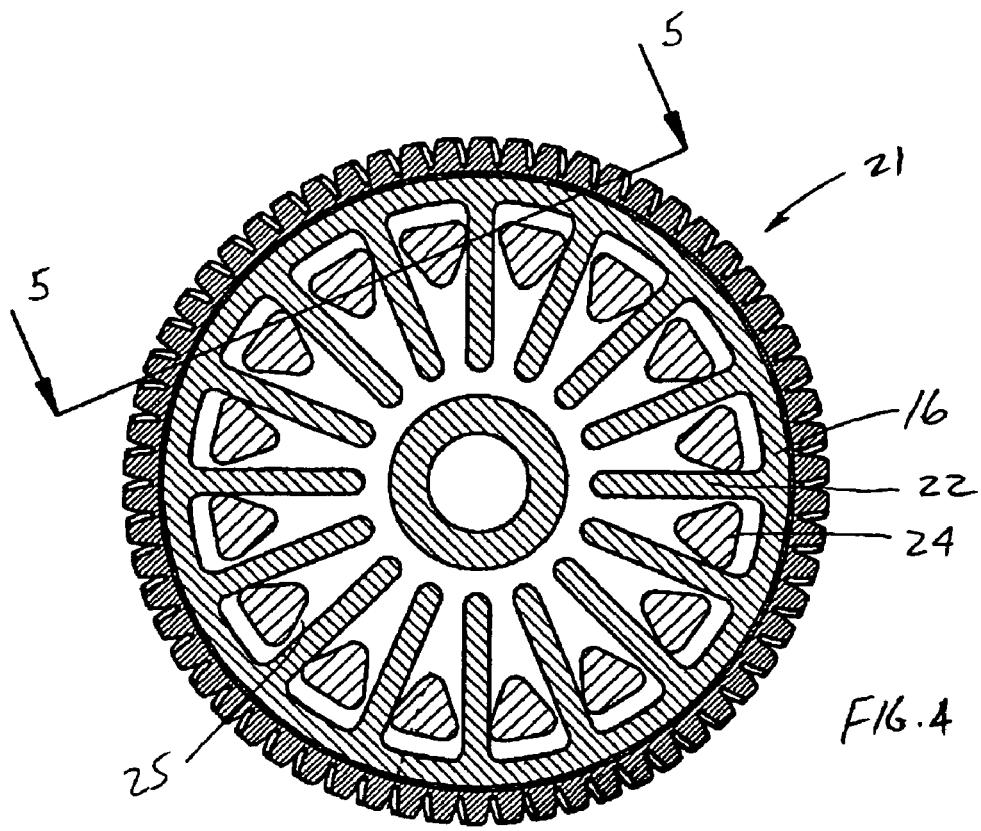
FIG. 4 is a sectional view of the output gear and driver of the motor of the invention shown in an assembled condition.
Figure 5:
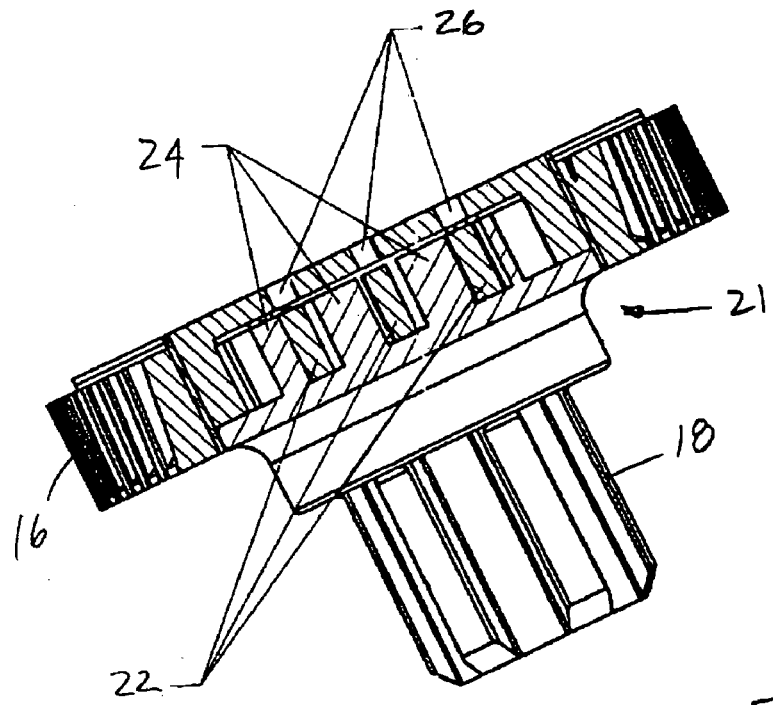
FIG. 5 is a sectional view taken along the line 5—5 of FIG. 4.

With reference to FIG. 1, an electric motor, generally indicated at 10, is shown in accordance with the principles of the present invention. The motor 10 includes a shaft 12 having a worm 14 that meshes with teeth 15 of an output gear, generally indicated at 16. A driver 18 is operatively coupled to the output gear 16 for rotation therewith. The output gear 16 and the driver 18 are supported for rotation by a post 20 of the motor 10. The output gear 16 and driver 18 define a drive assembly 21 (FIGS. 4 and 5) of the motor 10. In the embodiment, the driver 18 is constructed and arranged to move a window of a vehicle.

As best shown in FIG. 3, a plurality of arms 22 extend from a periphery of the output gear 16, radially towards the center of the output gear 16. A series of cams 24 are provided in a circular arrangement about the periphery of the driver 18. The arms 22 have a height h (FIG. 3) as measured from a base 23 so as to define a pocket 25 between adjacent arms 22. The cams 24 extend outwardly from a flange 27 of the driver 18 with each cam 24 being received in an associated pocket 25. Each cam 24 has a generally triangular cross-section with rounded vertices 29 for smooth interaction with the arms 22. When the output gear 16 and the driver 18 are assembled, the cams 24 and arms 22 intermesh creating a cantilever beam with a single intermediate load system that is repeated a number of times around the axis of rotation of the drive assembly 21 to meet the torque requirement of the system. For manufacturing purposes and to eliminate the need of providing a separate component to achieve the dampening function as noted above, each arm 22 includes a cored opening 26 on the bottom side of the output gear 16.

Since the drive assembly 21 will encounter thousand of cycles during its design life, a material with specific mechanical characteristics is used for the output gear 16 and driver 18. It is noted that the gear teeth 15 of the output gear 16 can be the same or a different material from the rest of the output gear 16. In the event that different materials are employed, a dual shot mold process can be used avoiding the extra cost of a separate component and its assembly.

The operation of the drive assembly 21 is as follows. As the system, (e.g., an automobile window moved by the motor 10) reaches the end of travel, the driver 18 stops while the output gear 16 continues to rotate. The dampening created absorbs some or all of the kinetic energy of the output gear 16 (due to a cam 22 contacting an associated arm 24) while the motor 10 stalls. Note that the drive assembly 21 of the embodiment is not a torque limiting system, but its sole purpose is to dissipate energy in a cost-effective manner.

In general, the drive assembly 21 of the invention can be used in any motor having a worm gear for coupling to a driver.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A drive assembly for an electric motor having a rotatable shaft including a worm, the drive assembly comprising:

an output gear constructed and arranged to mesh with the worm, the output gear including a plurality of arms extending generally from a periphery of the output gear radially towards a center of the output gear, and a driver operatively associated with the output gear to rotate therewith, the driver including a plurality of cams near a periphery thereof, the cams being operatively associated with the arms so that when the driver stops rotating while the output gear continues to rotate, each cam engages an associated arm to absorb kinetic energy of the output gear while the motor stalls, wherein each arm defines a substantially cantilever beam structure.

2. The assembly of claim 1, wherein a pocket is defined between adjacent said arms and the cams extend outwardly from a flange of the driver, each cam being received in an associated said pocket.

3. The assembly of claim 1, wherein each arm includes a cored opening on a bottom side of the output gear.

4. The assembly of claim 1, wherein each cam has a generally triangular cross-section with rounded vertices.

5. The assembly of claim 1, wherein the output gear has teeth about an entire periphery thereof that are constructed and arranged to mesh with teeth of the worm.

6. The assembly of claim 5, wherein the teeth of the output gear and the arms are of the same material.

7. The assembly of claim 5, wherein the teeth of the output gear are of a material different from that of the arms.

8. A drive assembly for an electric motor having a rotatable shaft including a worm, the drive assembly comprising:

an output gear constructed and arranged to mesh with the worm, the output gear including means for engagement, and a driver operatively associated with the output gear to rotate therewith, the driver including means for contacting, operatively associated with the means for engagement, so that when the driver stops rotating while the output gear continues to rotate, the means for contacting engages the means for engagement to absorb kinetic energy of the output gear while the motor stalls, wherein the means for engagement includes a plurality of arms, each arm defining a substantially cantilever beam structure.

9. The assembly of claim 8, wherein each arm extends generally from a periphery of the output gear radially towards a center of the output gear, and the means for contacting includes a plurality of cams disposed generally about a periphery of the driver.

10. The assembly of claim 9, wherein a pocket is defined between adjacent said arms and the cams extend outwardly from a flange of the driver, each cam being received in an associated said pocket.

11. The assembly of claim 9, wherein each arm includes a cored opening on a bottom side of the output gear.

12. The assembly of claim 9, wherein each cam has a generally triangular cross-section with rounded vertices.

13. The assembly of claim 8, wherein the output gear has teeth about an entire periphery thereof that are constructed and arranged to mesh with teeth of the worm.

14. The assembly of claim 13, wherein the teeth of the output gear and the means for engagement are of the same material.

15. The assembly of claim 13, wherein the teeth of the output gear are of a material different from that of the means for engagement.

16. An electric motor including:

a rotatable shaft including a worm, and a drive assembly comprising:

an output gear meshing with the worm, the output gear including a plurality of arms extending generally from a periphery of the output gear radially towards a center of the output gear, and a driver operatively associated with the output gear to rotate therewith, the driver including a plurality of cams near a periphery thereof, the cams being operatively associated with the arms so that when the driver stops rotating while the output gear continues to rotate, each cam engages an associated arm to absorb kinetic energy of the output gear while the motor stalls, wherein each arm defines a substantially cantilever beam structure.

17. The motor of claim 16, wherein the driver is constructed and arranged to move a window of a vehicle.

18. The motor of claim 16, wherein a pocket is defined between adjacent said arms and the cams extend outwardly from a flange of the driver, each cam being received in an associated said pocket.

19. The motor of claim 16, wherein each arm includes a cored opening on a bottom side of the output gear.

20. The assembly of claim 16, wherein each cam has a generally triangular cross-section with rounded vertices.

* * * * *